United States Patent
Wong

Patent Number: 5,084,232
Date of Patent: Jan. 28, 1992

[54] TRAJECTORY SOLID ANGLE'S IMPACTS TO PHYSICS AND HIGH TECHNOLOGIES

[76] Inventor: Po K. Wong, 50 Bradley St., Somerville, Mass. 02145-2924

[21] Appl. No.: 144,461

[22] Filed: Mar. 8, 1989

[51] Int. Cl.$^5$ .............................................. G21C 11/00
[52] U.S. Cl. .................................................. 376/277
[58] Field of Search ......................... 376/297, 277, 463

[56] References Cited

U.S. PATENT DOCUMENTS 3,936,219 2/1976 Holmes ............................... 376/297

Primary Examiner—Charles T. Jordan
Assistant Examiner—Richard W. Wendtland

[57] ABSTRACT

In 1974, a well-known research problem in Statistical Mechanics entitled "To determine and define the probability function $P_2$ of a particle hitting a predesignated area, given all its parameters of generation and ejection." was openly solicited for its solution from research and development organizations in U.S.A. One of many proposed solutions of the problem, initiated at that time, is by means of the TRAJECTORY SOLID ANGLE(TSA). TSA is defined as the integral of the dot product of the unit tangent of the particle's trajectory to the vectorial area divided by the square of the position vector connecting between the point of ejection and that of the surface to be hit. The invention provides:(1) The precise and the unique solution of a previously unsolved $P_2$ problem:(2) Impacts to the governmental NRC safety standards and DOD weaponary systems and many activities in the Department of Energy;(3) Impacts to update the contents of text books of physics and mathematics of all levels; (4) Impacts to the scientific instrumentations with applications in high technologies. The importance of TRAJECTORY SOLID ANGLE can be quoted from a letter by the late Institute Professor P. M. Morse of MIT who reviewed the DOE proposal P7900450 (reference No. 7) in 1979 and addressed to the inventor." If the TRAJECTORY SOLID ANGLE is correct it will provide a revolutionary concept in physics. . . ".

1 Claim, 4 Drawing Sheets

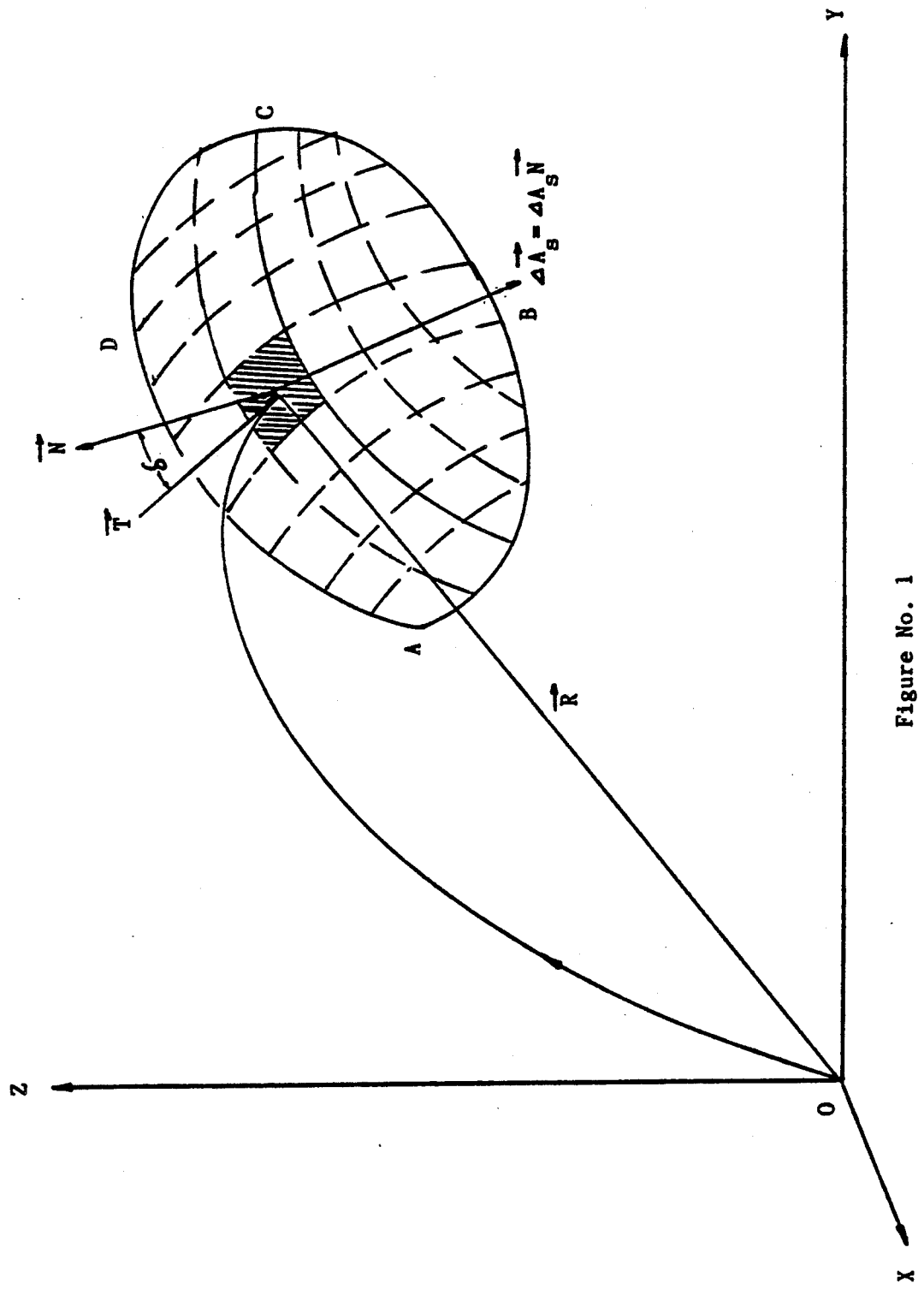
Figure No. 1

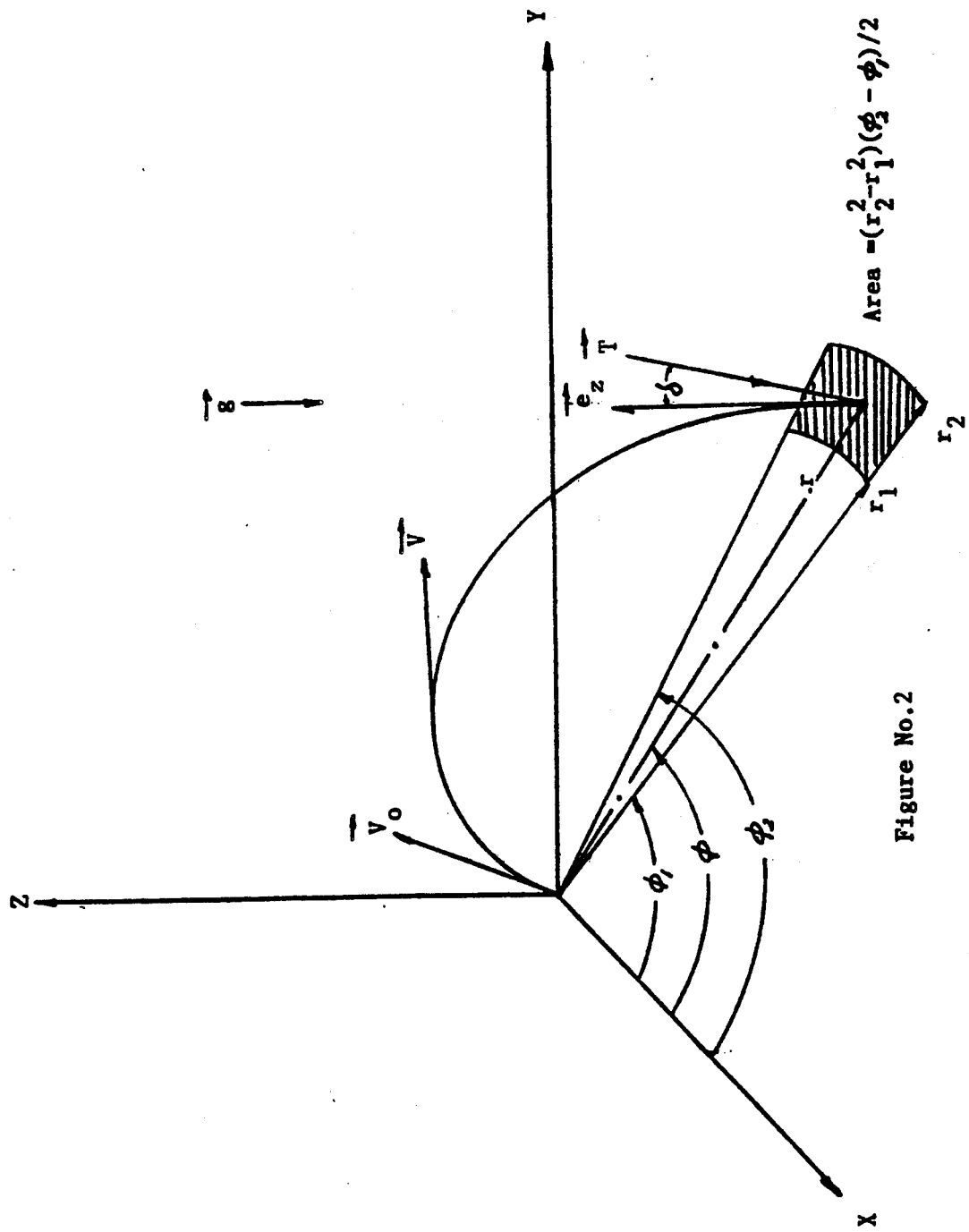
Figure No. 2

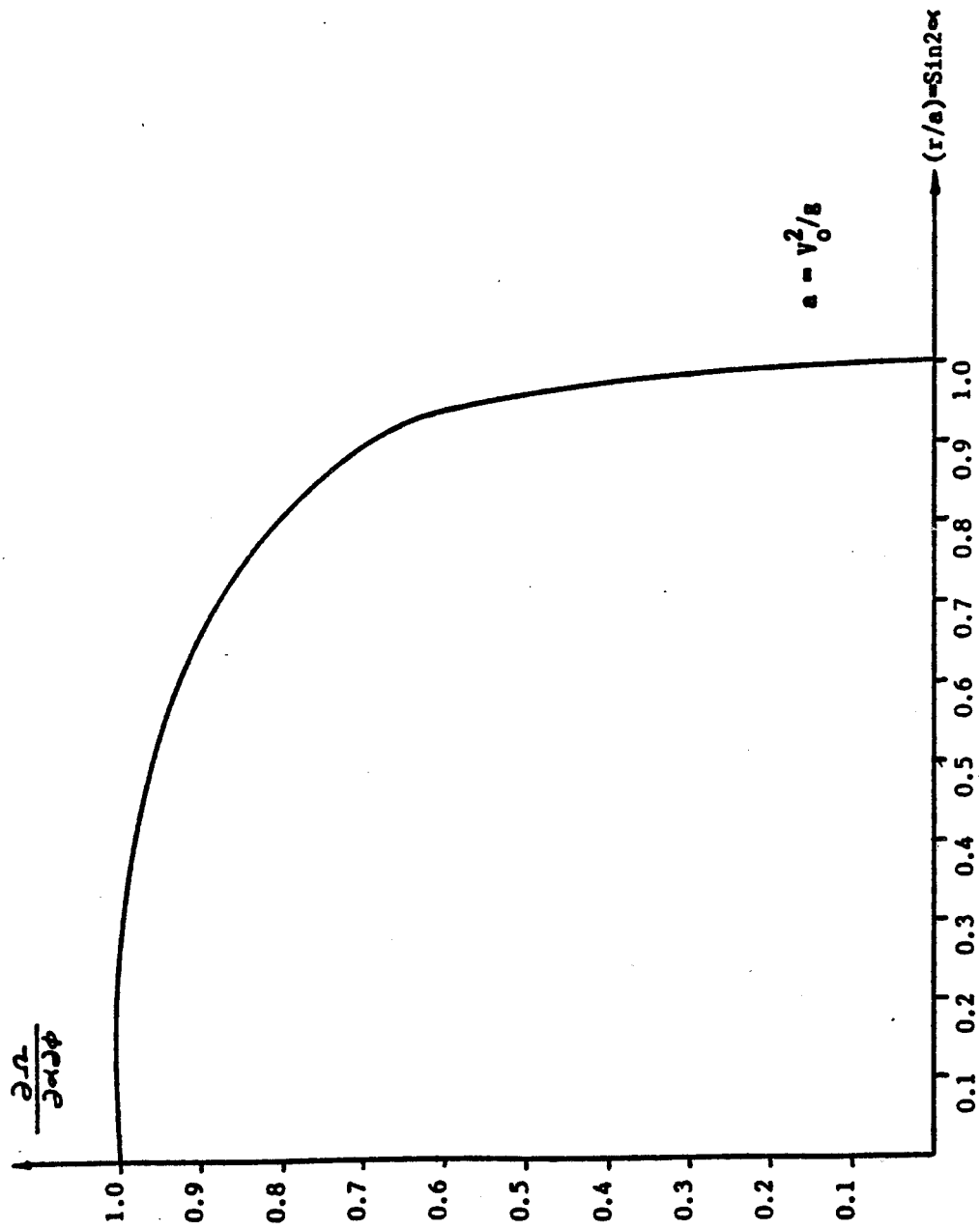
Figure No.3

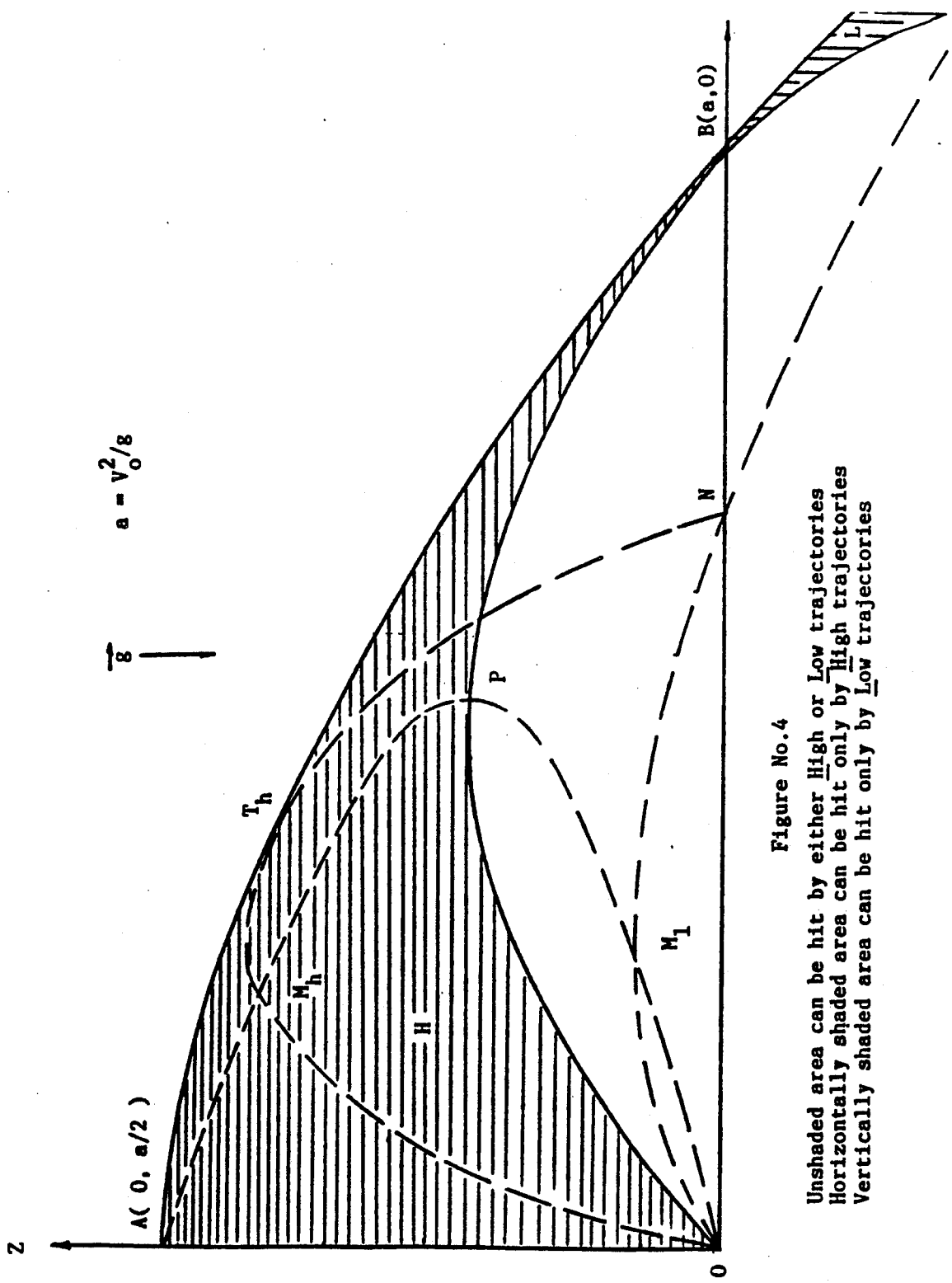
Figure No. 4
Unshaded area can be hit by either High or Low trajectories
Horizontally shaded area can be hit only by High trajectories
Vertically shaded area can be hit only by Low trajectories

TRAJECTORY SOLID ANGLE'S IMPACTS TO PHYSICS AND HIGH TECHNOLOGIES

The present invention provides: (1) The precise and the unique solution of a previously unsolved $P_2$ targeting problem; (2) Impacts to the governmental NRC nuclear safety standards, DOD weaponary systems development and many other activities in NASA and in the Department of Energy; (3) Impacts to update the contents of text books of physics and mathematics of all levels for education; (4) Impacts to the designs of scientific intrumentations with applications in high technologies. In conclusion, the invention of TRAJECTORY SOLID ANGLE provides a revolutionary concept in the fundation of physics. It it is confirmed to be true, it will open a new era for researches in physics, mathematics, engineering, advanced instrumentations and scientific measurements.

BACKGROUND OF THE INVENTION

Back to 1974 and earlier, the U.S. Atomic Energy Commission (AEC) (now the Department of Energy (DOE) and the Nuclear Regulatory Commission (NRC) openly solicited the solution of an unsolved problem which can be equivalently stated as: TO DETERMINE AND DEFINE THE PROBABILITY FUNCTION $P_2$ FOR A PARTICLE TO HIT A PREDESIGNATED AREA, GIVEN ALL ITS PARAMETERS OF GENERATION AND EJECTION.

Responding to the solicitation to solve the problem, a committee of scientists, mathematicians, and engineers from many companies was formed. The companies included: Westinghouse, General Electric, Raytheon, Stanford Research Institute, ... and many other companies. They produced many reports to solve the problem. Those reports were circulated from one company to the other for the participants to provide mutual reviews and feedbacks in order to obtain the TRUE solution. The inventor, working then in 1974 at Stone & Webster Engineering Co. in Boston, Mass., was also assigned to review and evaluate some of those reports. The inventor was also requested to provide his own solution of the problem in addition to the assignment of reviewing others' reports. As a result, the author invented in October 1974 a new physical term "TRAJECTORY SOLID ANGLE" (TSA) to solve the solicited problem. The TSA was a new name having been called by the inventor in order to identify for its difference from the very well-known Geometric Solid Angle (GSA). Before October 1974, there was no such name as (TSA) in the nomenclature of science and engineering. On the other hand, the Geometric Solid Angle (GSA) has been very well known to all. The original hand-written report in which the TSA was first invented has been kept and saved by the Stone & Webster Engineering Co. since October 1974. Only copies of this original work together with two other topics original work (muti-reservoir transient problems' formulation and solution, and the solution of indeterminate structural systems' problem) were returned to the inventor in early 1975 by Stone & Webster Engineering Co. when the inventor was separated from the company. All these can be seen from the evidences of a copy of the inventor's Mar. 29, 1975 letter to Mr. V. A. Suziedelis, Senior Engineering Manager and Vice President, Stone & Webster Engineering Co. and the inventor's Sept. 8, 1977 letter to Dr. Saul Levine, Director, Office of Nuclear Regulatory Research, Nuclear Regulatory Commission (NRC). These important letters can be found from the cited reference No. [17] which are documented with: (1) reponses to the review and comments about the paper 82-IHTC-86" ON THE INITIATION OF TRAJECTORY SOLID ANGLE AND ITS INFLUENCE TO RADIATIVE HEAT TRANSFER" in 1981; (2) reponses to the review from NRC about the TSA proposal; (3) responses to the U.S. Army Missile Research and Development Command's review about TSA; (4) responses to the U.S. Army Ballistic Research Laboratory of Aberdeen Proving Ground's review about TSA; (5) reponse to the review from Professor Walter Hauser of Northeastern University. The responses to the reviews for DOE proposal No. P7900450 (cited reference [7]) can be seen from cited reference No. [15].

As indicated in cited references [17] and [15], the TSA concept has been rejected from one agency to the other. It was enrouted for review from NRC to BRL to U.S. Army Misslie R&D Command; to National Science Foundation, AFSC-AFAL, AFSC-SAMSO, AFSC-AFOSR, AFSC-RADC, AFSC-AFGL, AFSC-ESD, EPRI, ERDA, JCM-20, SER 211/103 and back to DOE high energy physics division in Jan. 17, 1979 again. It was unfortunate that the reviewers from DOE rejected the proposal again and DOE advised that the inventor should send it to National Science Foundation for support. Again the reviewers of DAR of NSF rejected the proposal and it was transferred to the Physics Division of NSF. It is unfortunate that the reviewers rejected the proposal again. The continuous rejections to accept the concept of TSA by the Federal Agencies; Academic institutions; numerous scientific journals have forced the inventor to take two actions: (1) Formally file the patent of invention of TRAJECTORY SOLID ANGLE; (2) Openly challenge scientists in the 1989 AAAS Annual Meeting, Jan. 14-19, 1989 in San Francisco by sending the cited reference [19] to 11 session organizers; by presenting the TSA papers (cited reference [1] and [2]); by appearing himself in most of the related sessions to discuss what, why, how the TSA concept being important to them and that they have been taking the wrong track to solve their problems. The action of filing the TSA patent was advised by Dr. John Lyons, Director of Engineering, and Dr. George A. Sinnott, Associate Director of Technical Evaluation, both of National Bureau of Standards (NBS) in April 1985. As a result of their advices, the patent for the invention of TRAJECTORY SOLID ANGLE was initially filed in the attachments of an open letter dated Jan. 7, 1986 sent to the Commissioner of Patents and to the Executive Heads both in the Federal and State government of Mass. and to some members of the U.S. Congress. The action of open challenges to the scientists in the AAAS 1989 January Meeting have been done in last month. The TSA proposal is again submitted back to NSF for support. The current proposals pending supports from NSF are cited reference No.: [20], [21], [22].

Thus far, since the invention of the TRAKECTORY SOLID ANGLE by the inventor in October 1974, it has been continuously developed alone solely by the inventor. It has never been funded by any organizations; Federal; state; local and public. All the proposals and technical information, papers and data are strictly proprietary.

SUMMARY OF THE INVENTION

As indicated in the BACKGROUND OF THE INVENTION, the most relevant work proposed before 1974 in U.S.A. to solve the $P_2$ targeting problem can be traced from the references of and the reports by Sermanderes [3], Bush [4], Shaffer et al [5], and by the partial notes [6] of a PSAR (Preliminary Safety Analysis Report) of Delmarva Power & Light Company Summit Stattion, April 1974. These four reports concentrated in solving the same example of the solicited targeting problem that is to find the probability function $P_2$ for a ejected turbine missile to hit a predesignated area assuming it moves in vacuum and under a constant gravitation. A solution of this looks-like-a-simple problem was also proposed by the inventor [7] who was simultaneously assigned to make a detail technical review of those reports. As can be seen from the 20 pages hand-written summary that was in the proposal by the inventor [7], the Geometric Solid Angle (GSA) approach to solve the $P_2$ targeting problem was discussed in the reports by Sermanderes [3] and by [6]. However, as indicated by the inventor at that time the Geometric Solid Angle (GSA) is only one of the very special case of the invented TRAJECTORY SOLID ANGLE (TSA). The (TSA) was invented without proof at that time making an analogy with the (GSA) that had been used for years for calculation of the scattering & collision cross-section of particles; radar scanning cross-sections; geometric shape factors in radiative heat transfer; and in optics. The (TSA) was invented in a mood of intant reflection at a critical time when the author was told to write a final report on the $P_2$ targeting problem after he had been working and reviewing the work by others for a continuous period of three months. Even since then the (TSA) has been continuously developed alone by the inventor to examine its validity and truth in solving various kind of problems related to Statistical Mechanics despite of the confrontation and oppositions from all sources. After his separation from Stone & Webster Engineering Company, the inventor was forced to form SYSTEMS RESEARCH COMPANY in order to survive from being unemployed. The SYSTEMS RESEARCH COMPANY's Jan. 17, 1979 unsolicited proposal [7] had provided the various targeting problems having been solved and had indicated the approaches and research plans step by step through all the responses by the inventor to the mutual reviews and discussions with professionals in U.S. governmental, academic, and industrial organizations. It was and still is the current opinion of the inventor that a new statistical method has been found through the definition of (TSA). This new parametric statistics, being characterized and derived from fractional ratio or from the intersection and union of the acceptable laws of physics and the set theory of mathematics, is applicable for a macropic body as well as for a microscopic particle of mathematically defined infinitestimal size under the action of any force and moment fields. This new parametric statistics, being different from the usual consequential statistics or non-parametric statistics, could have been also the essential element that was missed by Einstein in his incomplete work for the unified field theory. With the precise definition of (TSA) and the definite procedures to find the probability function $P_2$, the probability density function (pdf) for the particle hitting on a surface can be also determined. Thus the physical quantities like dynamic pressure, density, linear momentum, angular momentum and kinetic energy distribution of the particle at any location can also be obtained by integration of the product of the physical quantity with the (pdf) over the predesignated area. This is a standard procedure in statistics to find the expectation values of any functions once the (pdf) is obtained.

The important role of Geometric Solid Angle (GSA) in classical and modern physics and its relationship to the inventor's TRAJECTORY SOLID ANGLE (TSA) can further be compared and described in the following:

The Geometric Solid Angle (GSA), a mathematical definition from differential geometry well known to scientists and engineers for years, has been applied to study the theory of scattering of particles that was summarized and provided with detail references by Watson [8]. It has been also appied to study the kinetic theory of ideal gas as shown by Lee et al [9] and the radiative heat transfer by Hottel et al [10]. The six-dimensional phase space, used in kinetic theory of gases and originated by Maxwell and Boltzmann, has become the foundation of statistica and quantum mechanics. The main idea of statistical mechanics is to apply the laws of probability and methods of statistics to study the mechanics of particles and bodies. Thus the problem of studying the probability of a particle striking on a predesignated area or on another particle in various force fields has been the central issue in statistical mechanics. When this is applied to the photon that carries a definite amount of energy, it becomes the subject of quantum mechanics. However, as asserted by Park [11], the establishment of a rigorous footing on statistical quantum mechanics from the point of view of quantum mechanicists seems to be difficult. This explained why, aside from all known approaches for the $P_2$ targeting problem, alternative means were continuously sought for a firm answer before and even after 1974 when the (TSA) was first invented. As one traces through all the references as cited, one will find that the (GSA) has been used in various topics for fundamental analysis, calculation and comparison with experiments in both classical and modern physics. Since it has been widely used for a long period of time and thus it was and still is considered by many that the (GSA) being used in various topics of classical and modern physics is the solution of the $P_2$ targeting problem. This can be challenged by the invention of the (TSA) which contains (GSA) as one of its special case of millions.

In summary, the advantages of the invention over all other methods in the past to solve the $P_2$ targeting problem are:

1. The invention of TRAJECTORY SOLID ANGLE provides the *most precise definition* to solve the problem for the first time in October 1974. Comparing the (TSA) method with all other methods at that time, all other methods became *approximate*. For examples: the Monte Caro Methods; the Geometric Solid Angle (GSA) method are all *conditionally acurate in some given ranges of parameters* but *not precise in all ranges of the given parameters*.

2. The definition of (TSA) is *explicitly defined* with *all parameters implicitly contained within the definition* while all the other methods do not.

3. Due to the precise definition of (TSA), it is applicable for macroscopic bodies as well as for microscopic particles of mathematically defined infinitestimal size under the actions of any force and moment fields between and among the bodies and particles. Therefore, the (TSA) provides great imacts to the entire range of physics; from the calculation of the collision cross sections of sub-nucleus particles in high energy physics and to that of galaxies in astronomy. The applicabilities of all other methods are relatively limited.

4. The Geometric Solid Angle (GSA) of any targeted area, being finite or infinitesimally small, is unchanged with respect to the location of the source where the particle is ejected. The (GSA) is not related to the parameters of ejection of the particle at all. It is a pure mathematical quantity. The TRAJECTORY SOLID ANGLE (TSA) is a term containing all the parameters of generating the particle and the targeted area to be hit. Thus the (GSA) of any targeted area is always finite and unchanged while that of (TSA) can be zero. This explains why the (TSA) can be and should be used to solve the P$_2$ targeting problem for particles and bodies under the action of any force and moment fields and that the (GSA) can not and should not be considered as the correct solution for the P$_2$ problem. There will be errors comparing the use of (TSA) between the use of (GSA) to solve the same problem. The errors will range from 0% to 100%.

5. Since the collision cross sections of many problems in central force fields (which include: the hydrogen model; Alpha scattering; moon-earth model; Comet Halley scatters around the solar system . . . etc.) have been based on the use of (GSA) for calculation and have been published in text books around the world, the furture assertion the truth of (TSA) will provide a great impact to all those results in the past.

6. The (TSA) concept and its definition not only confirms the well known Heisenberg's principle of uncertainty in physics, but also provides the precise definition and procedures to calculate the uncertainty in term of numbers as precise as we want.

7. The most important concept of (TSA) is that the definition can be applied to discover new laws and new particles by comparison and matchings of the unknown results with the already confirmed and proved results. If there are new laws of physics that describe the particle motions other than those of Newton's classical mechanics and Einstein's narrow and general relativity, the present (TSA) concept is still applicable to obtain the precise P$_2$ function for the problem.

8. Four examples are selected to illustrate how to obtain the probability distribution functions by means of (TSA): These examples are; Alpha scattering; particle in uniform, isotropic linear motion; particle under assumed constant gravitatonal pull on a plane; particle in a medium where the resistance force is linearly proportional to the velocity of the particle and under a uniform gravitational field. These examples are selected on the basis that they are well known and can be found from the open literatures. They were selected with the intention to show that even with such simple well known examples, the correct probability functions and cumulative distribution functions of these problems have never been obtained before. Whether exact solutions can be obtained from the equations of motion that govern other problems will not be the issue because the equation of motions can always be solved by means of numerical analysis together with computer programming. The key issue is that through the definition of (TSA), the P$_2$ functions can be precisely defined and obtained. The (TSA) can be applied to solve the most fundamental problems in physics that include all the subjects listed as cited references in this application.

BRIEF DESCRIPTION OF THE DRAWINGS

FIG. No. 1 shows a finite surface area ABCDA which can be described with respect to a fixed coordinate system is designated to be hit by a particle generated and ejected from the origin of the coordinate system. The finite area ABCDA to be hit can be subdivided into almost infinite number of infinitesimal surface areas, thus the total surface area in vectorial form can be expressed as $$\vec{A} = \vec{A}_{ABCDA} = \sum_{s=1}^{s=\infty} \vec{\Delta A_s}$$

Each infinitesimal surface area $\Delta \vec{A}_s$ is connected by the position vector $\vec{R}_s$ which defines the equations of a surface. The spherical surface formed by the position vector passing through a particular infinitesimal surface area (which is as small as almost like a point) is $4\pi R_s^2$, where $0 < R_s \leq \infty$.

The probability for the particle to hit a infinitesimal surface area $\Delta \vec{A}_s$ depends on the particle's unit tangent vector $\vec{T}$.

If $\vec{T}$ is parallel (direct common sense, since the surface area vector has a unit vector perpendicular to the surface area, thus mathematically it should have been said perpendicular) to the surface area $\Delta \vec{A}_s$, the particle will miss the surface.

If $\vec{T}$ is perpendicular (it should have been said parallel mathematically) to $\Delta \vec{A}_s$ the particle will hit the surface at a right angle.

The probability for the particle to hit on $\Delta \vec{A}_s$ is therefore can be written as $$P_s = \frac{\vec{T} \cdot \vec{\Delta A_s}}{4\pi R_s^2}$$

The probability for the particle to hit the entire surface area ABCDA is therefore $$P_2 = \sum_{s=1}^{s=\infty} P_s = \sum_{s=1}^{s=\infty} \frac{\vec{T}_s \cdot \vec{\Delta A_s}}{4\pi R_s^2} = \int_A \frac{\vec{T} \cdot \vec{dA}}{4\pi R^2} = \int_A \frac{\cos\delta \vec{dA}}{4\pi R^2} = \frac{\Omega}{4\pi}$$

These completes the proof that the (TSA) can be used to solve the P$_2$ targeting problem. (The unit tangent vector T contains all the parameters of generation and ejection of the particle and satisfies the governing equations of the laws of physics).

FIG. No. 2 shows that particles under assumed constant gravitational pull on a plane are generated and ejected from the origin of the coordinates. The particles can be electrons, ions or unchanged particles. The gravitation g can be simulated by electric and/or magnetic field for the charged particles. The plane is the target surface to collect the particles. The figure represents the schematic diagram of a mass spectrometer. Given the initial velocity $v_o$ of a ejected particle, find the probability of the particle that would hit the predesignated area bound by $r_1 \leq r \leq r_2$; $\phi_1 \leq \phi \leq \phi_2$.

FIG. No. 3 shows the probability density function of the particle hitting on the plane surface. The cumulative probability to hit on any area on the plane surface can be calculated by carrying out the integration precisely. For example:

given
$v_o = 9.8$ m/sec    $g = 9.8$ m/sec$^2$
$a = v_o^2/g = 9.8$ m = Max. Range
$r_1 = 9$ m    $r_2 = 10$ m
$r_2 - a = 10 - 9.8 = .2$ m will not be hit
$\phi_2 - \phi_1 = \pi/6$    targeted area = 4.974 m$^2$ The cumulative probaility for the particle to hit the target area $= \Omega/(4\pi) = 0.0035846$.

FIG. No. 4 shows the classification of regions that can be reached only by the high; only by the low, and by both high and low trajectories of the particles.

rigion H bounded by OPBT$_h$AO can be reached by high trajectory only.

Region L bounded by DBCD can be reached by low trajectory only.

Region HL bounded by OPBDIO can be reached by both high and low trajectories.

Region outside of OAT$_h$BCIO cannot be reached by either high or low trajectories.

The TRAJECTORY SOLID ANGLE (TSA), Probability Density Function (pdf), and Cumulative Distribution Function (cdf) are all different in each region. They are all zero outside of the region bounded by OAT$_h$BCIO.

FIG. No. 1 is applicable for the general targeting problems in mass spectrometers particle accelerators, super-colliders; actual missiles and rockets targeting problems scattering and collision of astronomical bodies, chaos of classical dynamics and quantum mechanics, fluid dynamics and the weather prediction ... etc.

FIGS. No. 2, 3, 4 are demonstrated in great details how to apply the invention of (TSA) to solve a specific well-known-simple problem but is Probability Density Function (pdf) and Cumulative Distribution Function (cdf) have never been precisely obtained by all other methods before the invention of (TSA).

DETAILED DESCRIPTION OF THE INVENTION

The detailed description of the invention can be referred to the cited reference No. [1] and [2] which are technical papers contributed for the Poster Sessions in the American Association for the Advancement of Science (AAAS) 1989 Annual Meeting, Jan. 14-19, 1989 in San Francisco, Calif. The formal responses byy the inventor to all reviewers who reviewed and evaluated the inventor's papers and technical proposals about the concept and the application of TRAJECTORY SOLID ANGLE (TSA) can be found from references No. [15] and [17]. The open challenges to confirm the truth of (TSA) in the 1989 AAAS Annual Meeting can be referred to reference No. [19]. References No. [7], [16], [18], [20], [21], and [22] are previous technical proposals produced by the inventor requesting the supports from the U.S. federal governmental organizations. All these documents provide the evidences of impacts and resistances how the professionals react to accept the truth of TRAJECTORY SOLID ANGLE that should be used to solve the P$_2$ targeting problems in the past 14 years since the invention of TSA in October 1974.

The cited references No. [1], [2], [15], [17], and [19] are submitted as the supporting documents with the patent application.

As required in CFR S1.71, a description of the preferred embodiments are provided in the followings:

As indicated before, the TRAJECTORY SOLID ANGLE (TSA) deviates from but includes the Geometric Solid Angle (GSA) as a special case. (TSA) is defined as the integral of the dot product of the unit tangent of the particle's trajectory to the vectorial area divided by the square of the position vector connecting between the point of ejection and that of the surface area to be hit.

The formal derivation and definition of (TSA) can be obtained by means of Fractional Ratio. Define:

$\vec{T}$, the unit tangent of a trajectory on which the particle travels along at any time. It is a function of its initial time $t_o$, initial position vector $\vec{r}$, initial velocity vector $\vec{r}_o$, initial mass $m_o$, speed of light c, sum of all forces $\Sigma \vec{F}_i$ acting on the particle, sum of all moments $\Sigma \vec{M}_i$ acting on the particle and a function of time t. The unit tangent can be obtained from solving the governing equations for dynamics of rigid bodies and particles including but not limiting to the general relativity as well as the special relativity equations which are shown in the following as an example $$\frac{d(m\vec{r})}{dt} = \frac{d}{dt}\left(m\frac{d\vec{r}}{dt}\right) = \sum_{i=1}^{i} \vec{F}_i(r,\dot{r},t)$$

$$\frac{d(\vec{r} \times m\vec{r})}{dt} = \frac{d}{dt}\left(\vec{r} \times m\frac{d\vec{r}}{dt}\right) = \sum_{i=1}^{i} \vec{M}_i(r,\dot{r},t)$$

$$m = \frac{m_o}{\sqrt{1 - \frac{|\dot{r}|^2}{c^2}}} \quad E = mc^2$$

The unit vector $\vec{T}$ can be obtained from solving the above set of equations after satisfying the initial conditions at $t = t_o$, $\vec{r} = \vec{r}_o(t_o)$, $\dot{\vec{r}} = \dot{\vec{r}}_o(t_o)$, $m = m_o(t_o)$ its magnitude is always 1 at any time t. Thus the unit tangent vector contains all the parameters of generation and ejection of the particle.

$$\vec{r} = \vec{r}(t_o, \vec{r}_o, \dot{\vec{r}}_o, m_o, \Sigma\vec{F}_i, \Sigma\vec{M}_i, t)$$
$$\vec{T} = \dot{\vec{r}}/|\dot{\vec{r}}|$$

$\vec{A}$, any vectorial surfaces in the universe, open or closed, its magnitue and direction can be obtained from the position vector $\vec{R}_s$ which defines the equations of the surface.

R, is the magnitude of the position vector connecting the points on the surface $\vec{A}$ to the coordinate system's origin from which the particle is released.

$d\vec{A}$, is the differential surface area $$\int_A \frac{\vec{T} \cdot d\vec{A}}{R^2}$$

is defined and called TRAJECTORY SOLID ANGLE (TSA) $= \Omega$

In particular, when the sum of all forces $\Sigma\vec{F}_i(\vec{r}, \dot{\vec{r}}, t)$ and the sum of all moments $\Sigma\vec{M}_i(\vec{r}, \dot{\vec{r}}, t)$ acting on the particle are zero, the solution of the governing equation is obtained for the particle moving uniformly and isotropically from the origin. Then the trajectory coincides with the position vector. Under this condition, the unit tangent T can be related to the position vector $\vec{R}$ as $$\vec{T} = \frac{\vec{r}}{|\vec{r}|} = \frac{\vec{R}}{|\vec{R}|} = \frac{\vec{R}}{R}$$

With this particular condition, the TRAJECTORY SOLID ANGLE (TSA) becomes Geometric Solid Angle (GSA) which is degenerated from TSA as $$\int_A \frac{\vec{R} \cdot d\vec{A}}{R^3}$$

This integral is equal to $4\pi$ for a surface large enough to enclosed the entire universe including the origin of the coordinate system. In general, the magnitude of this integral is less than $4\pi$ for any finte surfaces in the universe.

$4\pi$ is the maximum value of both (TSA) and (GSA).

GUIDED is equivalent to aiming at a target with a (TSA) from point to point on the trajectory.

UNGUIDED is equivalent to release the flying object in any direction at a (TSA) of $4\pi$ from a point.

GUIDED PROJECTILE is a projectile aiming at the target by control through a (TSA) enclosed by the envelope-surface formed by the projectile's trajectories and tangented to the target surface.

UNGUIDED PROJECTILE is a projectile being released and flying in any direction at a (TSA) of $4\pi$ from a point.

With all these terms, the probability targeting function $P_2$ can be derived and obtained with the BRIEF DESCRIPTION OF THE DRAWINGS on page 13 from FIG. No. 1.

One should notice that the (TSA) has been shown derived from with respect to the ejected particle source from a fixed point for convenience to demonstrate the basic principle. However, there are serveral important points from the present derivation of the (TSA) should be cleared:

(a) The (TSA) is not limited to be referred to a fixed point source. In fact, both the source point and the targeted surface can be in motions. When this is the case, the position vector becomes $$\vec{R} = \vec{R_2} - \vec{R_1}$$

and the unit tangent vector becomes $$\vec{T} = \frac{\vec{r_2} - \vec{r_1}}{|\vec{r_2} - \vec{r_1}|}$$

where, $\vec{r_1}$ and $\vec{R_1}$ are the velocity vector and the position vector of the source point, $\vec{r_2}$ and $\vec{R_2}$ are the velocity vector and the position vector of the targeted point.

(b) The generation and ejection of the particle is not necessary limited to a point source. It can be generated and ejected from a surface source. When this is the case, defining the surface intensity function (a function of any physical quantities/unit surace area of ejection) which can be the irradiance $E_e$ (W/m$^2$), the pressure p (N/m$^2$), the heat flux density q (W/m$^2$)... etc. Then the expectation values of these physical quantities from the source surface $\vec{A_1}$ to the targeted surface $\vec{A_2}$ is $$\int_{A_2} \int_{A_1} (q\vec{T} \cdot d\vec{A_1}) \frac{\vec{T} \cdot d\vec{A_2}}{4\pi R^2}$$

(c) Generalizing from the Largrance description of the motion of a particle to the Eulerian description of the physical quantities of a continuum at a field point, the (TSA) can also be defined for the continuum in fluid dynamics, elastodynamics, visco-elasto-dynamics (VED), Magneto-Viscoelasto-Dynamics (MVD) ... etc. Maintaining the same definition of (TSA), the unit vector can also be obtained from the solution of the governing equations of the continuum after satisfying the boundary and initial conditions of a physical problem. The unit vector in the Largrance particle description represents a particular particle's trajectory as a function of time while the unit vector in the Eulerian continuum description represents different particles' trajectories as a function of both space and time. In both descriptions, the (TSA) is a dimensionless probability function. The integrand of (TSA) is intrinsically always positive definite for a particle or a continuum under the actions any force and moment fields. Thus, the (TSA) definition will be applicable for the governing equations of fluid dynamics, elastodyanmics, visco-elasto-dynamics (VED), (MVD), the electromagnetic wave equations, quantum electrodynamics which was generalized from the well-known Schrodinger equation in quantum mechanics ... etc.

According to the correspondence principle (which states, roughly, that quantum mechanics makes the same predictions that classical physics does for systems in which classical physics is applicable), the turbine missile problem investigated by Sermanderes [3], Bush [4], Shaffer et al [5], [6], and by the inventor [7] should also be predicted as having the same result as obtained by the QM. However, one will be disappointed if he tries to use the quantum mechanics (QM) to solve the simple problem. The specific turbine missile probability problem had led to the invention of (TSA) and further to question the validity and the applicability of quantum mechanics. This is the most controversial issue opened to be settled by all scienties, mathematiccians and engineers in the world.

The procedures to find the distribution function $P_2$ for a particle striking a predesignated area, given all its parameters of generation and ejection can be systematically summarized in the following steps:

1. Solve the set of governing equations that govern the trajectory of the particle and obtain the position vector, the velocity vector and the trajectory equation in terms of initial conditions and all other parameters in the governing equations.
2. Find the unit tangent vector from the velocity vector or from the trajectory equation.
3. Find the unit normal vector and the differential surface area from the governing equation of the surface to be struck.
4. Find the intersection of the trajectory on the surface and set the intersection coordinates in terms of the two independent variables that define the surface.
5. The incident angle of the particle on the trajectory striking at the surface and be defined from the inner product of the unit tangent vector to the nuit normal surface vector expressed in terms of the two independent variables at the intersection.

6. The trajectory solid angle for the problem can be obtained from integration over the cosine of the incident angle multiplying the differential surface area divided by the square of the position vector of the surface.
7. The probability distribution function can be defined as the ratio of the trajectory solid angles (TSA).

As mentioned before, the cited reference No. [1] provides 4 examples of very well-known problems but their (pdf) and (cdf) have never been precisely obtained before. Reference No. [7] also provides the transient solution of a positive ion under electromagnetic field action with consideration of the relativistic effects being considered in the closed form solution. The ion is found in spiral motion and it is accelerated to the speed of light. This particular example is important for the calculation of collision cross section of ions by means of (TSA). There are almost hundreds of very well-known problems whose (pdf) and (cdf) must be recalculated again by means of (TSA). The (TSA)'s impacts in applications can further be summarized in the following:

1. In the (TSA) is confirmed to be the TRUE solution of the $P_2$ targeting problem, then: the impacts to the nuclear industries are:
   (a) It will force many companies in the nuclear business to re-examine their Preliminary and final Safety Analysis Report (PSAR & FSAR). For each nuclear power plant that was built, is being built, and shall be built.
   (b) It will affect the analysis of design which was based on other method of solution for many facilities in the nuclear power plants including the new nuclear core designs and developments.
2. The (TSA) impacts to the governmental NRC safety standards and DOD weaponry system development are:
   (a) It provides a direct impact to the missile probability standard that was already established in the NRC Report (WASH-1400) which is cited in reference No. [17] about The Reactor Safety Study.
   (b) It provides a direct impact to the guidance and control systems for targeting in our defense missile systems.
   (c) It provides a direct impact to the conventional weaponry targeting analysis.
   (d) It provides solutions of problems in Target Detection and Localization in:
      Special purpose acoustic transducers and sensors;
      Electromagnetics and Broadband Antennas;
      Theoretical and experimental tools with which to detect and classify nuclear surface/air burst at sea.
   (e) Ocean physics and engineering research in:
      Oceanographic instrumentation;
      Remote sensing techniques;
      Ocean volume reverberation modeling;
      Acoustic response of the ocean bottom
   (f) Computer and software engineering in:
      Inexpensive photolithograph techniques for microcircuit fabrications by alternative approaches in the resist materials or for ion beam machinery.
   (g) Materials researches.
3. It provides impacts to many activities in the Department of Energy (DOE) and in NASA:
   There are 11 separate tasks proposed to be done in the SYSTEMS RESEARCH COMPANY's 143 pages technical proposal DOE No. P7900450 to the Department of Energy, High Energy Physics Division. There are also at least 3 technical proposals having been submitted to NASA for funding and support.
4. It provides impacts to update the contents of text books of physics and mathematics of all levels.

The values of the invention depends on whether the solution of the $P_2$ targeting problem by means of the (TSA) is TRUE. If it is, it will provide all the impacts to practitioners, public and private decision makers, and the general public especially involved in education:
It will affect many previous Nobel Laureates' work in scattering and collision crossections of particles; in Statistical Mechanics and Quantum Mechanics. Specific work of interest includes: Rutherford's Alpha Scattering; Hofstadter's electron scattering; Yang's p-p collision and its scattering and the geometric picture; Fermi-Dirac, Bose-Einstein, Maxwell-Boltzmann statistics; quantum mechanics based on Schrodinger's equation; Schwinger and Feynman's quantum electrodynamics and Heisenberg's uncertainty priciple . . . etc.
All these topics are in the current text books of physics for graduate and undergraduate levels in all universities in the world. It follows that will influence the selection of materials for the secondary curriculum planning and development according to the impacts.

REFERENCES CITED

[1] Wong, Po Kee, "The Invention of TRAJECTORY SOLID ANGLE and Its Impacts to the Role of Precision Measurement in Physics" American Association for the Advancement of Science (AAAS) 1989 Annual Meeting Contributed Paper Poster Sessions, Physical Sciences Abstract No. 218, page 180, Jan. 14-19, 1989 San Francisco, Calif.

[2] Wong, Po Kee, "Evidences of Impacts and Resistances to Implement a Solved but Controversial Scientific Problem in Curriculum Development" American Association for the Advancement of Science (AAAS) 1989 Annual Meeting Contributed Paper Poster Sessions, Science & Technology Education Abstract No. 804, Jan. 14-19, 1989, San Francisco, Calif.

[3] Sermanderes, S. N., "Methods of Determining the probability of a Turbine Missile Hitting a Particular Plant Region" Westinghouse Topical Report. WCAP-7861, February, 1972.

[4] Bush, S. H., "Probability of Damage to Nuclear Components Due to Turbine Failure" A report of U.S. AEC and Battelle Memorial Institute, November 1972.

[5] Shaffer, D. H., Chay, S. C., McLain, D. K., and Powell, B. A., "Analysis of the Probability of the Generation and Strike of Missiles from a Nuclear Turbine" Westinghouse Research Laboratories Report, March 1974.

[6] "Turbine Missile Probability Analysis" Partial Notes of a PSAR of Delmarva Power & Light Company Summit Power Station, April 1974.

[7] Wong, Po Kee, "Initiation of the Definition of Trajectory Solid Angle and its Influence on Classical, Quantum and Statistical Mechanics" A SYSTEMS RESEARCH COMPANY's Jan. 17, 1979 unsolicited technical proposal to the U.S. Department of Energy, 143 pages, DOE Proposal No.: P7900450.

[8] Watson, K. M., "Collision of Particles" in *Encyclopedia of Physics* ed. by Besancon, R. M., 2nd, edition, pp. 140-144, Van Nostrand Reinhold Company, New York, Cincinnati, Toronto, London, Melbourne, 1974.

[9] Lee, J. F., Sears, F. W., and Turcotte, D. L., "*Statistical Thermodynamics*" Addison-Wesley Publishing Company, Inc. 1963.

[10] Hottel & Sarofim, "*Radiative Transfer*" McGraw-Hill Book Company, Chapter 2, pp. 25–71, 1967.

[11] Park, D., "*Introduction to the Quantum Theory*" McGraw-Hill, Inc. 2nd. ed., 1974.

[12] Hauser, W., "*Introduction to the Principles of Mechanics*" Addison-Wesley, Reading, Mass. 2nd. printing, April 1966.

[13] Pierce, Walter D. and Lorber, Michael, "*Objectives & Methods For Secondary Teaching*" Prentice-Hall, Inc., Englewood Cliffs, N.J., 1977, pp. 104–106, 92–141.

[14] Hass, Glen et al, "*Curriculum Planning: A New Approach*" Allyn and Bacon, Inc., 470 Atlantic Avenue, Boston, Mass. 1980, third edition, pp. 3–11, 40–50, 92–96, 145–150, 182–187, 156–258.

[15] Wong, Po Kee, "Initiation of the Trajectory Solid Angle and its Influence on Classical, Quantum and Statistical Mechanics" abstract & summary submitted to 15th International Congress of Theoretical and Applied Mechanics for review and evaluation to have been presented on Aug. 17–23, 1980, Toronto, Cannada, 3 pages. plus 14 pages of formal responses by the inventor to answer the questions by the reviewers who reviewed the inventor's DOE Proposal No.: P7900450 (reference No. 7). Total 17 pages.

[16] Wong, Po Kee, "The New Statistical Mechanics and its Impacts in Science Education" a SYSTEMS RESEARCH COMPANY's unsolicited technical proposal submitted to National Science Foundation Proposal No.: R0466, June 3, 1981.

[17] Wong, Po Kee, "Dec. 7, 1981 letter and 43 pages of SYSTEMS RESEARCH COMPANY's documents to Professor R. J. Goldstein, Senor Editor, ASME Contributions to the 7th International Heat Transfer Conference to have been held at the Technische Universitat, Munchen, Fed. Rep. of Germany from Sept. 6, 10, 1982 for presentation and publication of reference No. 1."

[18] Wong, Po Kee, "Nuclear Weapon Effects Simulation by Means of Continuum Mechanics and Paticle Dynamics Approaches and their Comparisons" a SYSTEMS RESEARCH COMPANY's SBIR proposal submitted to Defense Nuclear Agency (DNA) for support, Dec. 30, 1983.

[19] Wong, Po Kee, Oct. 17, 1988 open letter to 11 session chairmen organizers of the 1989 AAAS Annual Meeting in San Francisco, Calif., 7 pages.

[20] Wong, Po Kee, "The Application of the Invention of TRAJECTORY SOLID ANGLE for the Designs of Scientific Instrumentations." SYSTEMS RESEARCH COMPANY's SBIR technical proposal to National Science Foundation (NSF) No. ISI-8860922 June 20, 1988.

[21] Wong, Po Kee, "ADVANCED AUTOMOTIVE RESEARCH-Vehicle Structures and Materials" SYSTEMS RESEARCH COMPANY's proposal to NSF No. ISI-8860538. June 20, 1988.

[22] Wong, Po Kee, "PDE Solvers for Visco-Elasto-Dynamics (VED) and Their Applications in Space Materials and Structures." SYSTEMS RESEARCH COMPANY's SBIR proposal to NSF No. ISI-8860180. June 20, 1988.

What is claimed is:

1. A method of determining and defining a probability function $P_2$ for an object to impact a predesignated surface comprising the following steps:

(a) measure said object's parameters of generation and ejection, (b) solve a set of equations that govern a trajectory of said object and obtain a position vector, a velocity vector, and a trajectory equation in terms of initial conditions, (c) find a unit tangent vector from said velocity vector or from said trajectory equation, (d) find a unit normal vector and a differential surface area from a governing equation of said surface to be struck, (e) find an intersection of said trajectory on said surface and express intersection coordinates in terms of two independent variables that define said surface, (f) define an incident angle of said object on said trajectory striking at said surface as an inner product of said unit tangent vector and said unit normal vector expressed in terms of two independent variables at said intersection, (g) define a trajectory solid angle as an integral of a cosine of said incident angle multiplied by a differential of said surface area divided by a square of said position vector of said surface, and (h) define said probability distribution function as said trajectory solid angle divided by four pi.

* * * * *

UNITED STATES PATENT AND TRADEMARK OFFICE
CERTIFICATE OF CORRECTION

PATENT NO. : 5,084,232
DATED : January 28, 1992
INVENTOR(S) : Po Kee Wong

It is certified that error appears in the above-identified patent and that said Letters Patent is hereby corrected as shown below:

Column 2, line 25, "in" should read --on--.

Column 2, line 66, "Federal" should read --federal--.

Column 6, line 52, " T " should read -- $\vec{T}$ --.

Column 6, line 58, "unchanged" should read --uncharged--.

Column 7, line 30-34, " problems in mas spectrometers particle accelerators, super-colliders; actual missiles and rockets targeting problems scattering and collision of astronomical bodies, chaos of classical dynamics and quantum mechanics, fluid dynamics and the weather prediction.."
should read with the semi-colon -- ; -- separating special nouns:
-- problems in mass spectrometers; particle accelerators; super-colliders; actual missiles and rockets targeting problems; scattering and collision of astronomical bodies; chaos of classical dynamics and quantum mechanics; fluid dynamics and the weather prediction.. ...etc.--.

Column 7, line 37, " is " should read --its--.

Column 7, line 50, " byy " should read --by--.

UNITED STATES PATENT AND TRADEMARK OFFICE
CERTIFICATE OF CORRECTION

PATENT NO. : 5,084,232

DATED : January 28, 1992

INVENTOR(S) : Po Kee Wong

It is certified that error appears in the above-identified patent and that said Letters Patent is hereby corrected as shown below:

Column 8, line 16, "$\vec{r},$" should read -- $\vec{r}_o,$ --.

Column 8, line 17, "$\vec{r}_o$" should read -- $\dot{\vec{r}}_o,$ --.

Column 8, line 35, "$m = \dfrac{m_o}{\sqrt{1 - \dfrac{|\dot r|^2}{c^2}}}$" should read -- $m = \dfrac{m_o}{\sqrt{1 - \dfrac{|\dot{\vec{r}}|^2}{c^2}}}$ --.

Column 8, line 40, "$\vec{r}=\vec{r}_o(t_o), \vec{r}=\vec{r}_o(t_o)$" should read -- $\vec{r}=\vec{r}_o(t_o), \dot{\vec{r}}=\dot{\vec{r}}_o(t_o)$ --.

Column 8, line 47, "$\vec{T} = \dot{\vec{r}}/|\dot{\vec{r}}|)$" should read -- $\vec{T} = \dot{\vec{r}}/|\dot{\vec{r}}|$ --.

Column 8, line 64, "$F_i(\vec{r},\vec{r},t)$" should read -- $F_i(\vec{r}, \dot{\vec{r}}, t)$ --.

Column 8, line 65, "$M_i(\vec{r},\vec{r},t)$" should read -- $M_i(\vec{r}, \dot{\vec{r}}, t)$ --.

Column 9, line 2, "T" should read -- $\vec{T}$ --.

Column 9, line 5, "$\vec{T} = \dfrac{\dot{\vec{r}}}{|r|} =$" should read -- $\vec{T} = \dfrac{\dot{\vec{r}}}{|\dot{\vec{r}}|} =$ --.

Column 9, line 49, "$\dot{\vec{R}} = \dot{\vec{R}}_2 - \dot{\vec{R}}_1$" should read -- $\vec{R} = \vec{R}_2 - \vec{R}_1$ --.

Column 9, lines 52-54, "$\vec{T} = \dfrac{\vec{r}_2 - \vec{r}_1}{|\vec{r}_2 - \vec{r}_1|}$" should read -- $\vec{T} = \dfrac{\dot{\vec{r}}_2 - \dot{\vec{r}}_1}{|\dot{\vec{r}}_2 - \dot{\vec{r}}_1|}$ --.

UNITED STATES PATENT AND TRADEMARK OFFICE
CERTIFICATE OF CORRECTION

PATENT NO. : 5,084,232

DATED : January 28, 1992

INVENTOR(S) : Po Kee Wong

It is certified that error appears in the above-identified patent and that said Letters Patent is hereby corrected as shown below:

Column 9, line 56, " $\vec{r}_1$ " should read -- $\dot{\vec{r}}_1$ --.

Column 9, line 57, " $\vec{r}_2$ " should read -- $\dot{\vec{r}}_2$ --.

Column 10, line 6, "Largrance" should read --Largrange--

Column 10, line 16, "Largrance" should read --Largrange--

Column 11, line 22, " In " should read -- If --.

Column 11, line 26, " final " should read -- Final --.

Signed and Sealed this

Thirtieth Day of August, 1994

Attest:

BRUCE LEHMAN

Attesting Officer    Commissioner of Patents and Trademarks